THYRATRON VARIABLE-WIDTH-PULSE GENERATOR

Filed June 30, 1955

INVENTOR.
HENRY L. MC CORD
BY
[signature]
[signature]
ATTORNEYS

Jan. 13, 1959 H. L. McCORD 2,869,038

THYRATRON VARIABLE-WIDTH-PULSE GENERATOR

Filed June 30, 1955

2 Sheets-Sheet 2

INVENTOR.
HENRY L. MC CORD

BY G. D. O'Brien
V. C. Muller
ATTORNEYS 2,869,038

THYRATRON VARIABLE-WIDTH-PULSE GENERATOR

Henry L. McCord, San Pedro, Calif.

Application June 30, 1955, Serial No. 519,287

20 Claims. (Cl. 315—230)

(Granted under Title 35, U. S. Code (1952), sec. 266)

The invention described herein may be manufactured and used by or for the Government of the United States of America for governmental purposes without the payment of any royalties thereon or therefor.

This invention relates to a pulse generator, and more particularly to a variable width pulse generator preferably utilizing thyratron gas discharge tubes and providing an output pulse with sharp rise and fall times whose width is dependent on the bias voltage of one of the thyratrons.

One previous method of obtaining a variable width pulse with sharp rise and fall times was to use a variable length delay line as the pulse width determining element in a single thyratron pulse generator circuit. Another method was the addition of two step voltages, one positive and one negative, to give an output pulse which varied according to the relation of the occurrence of one step voltage with respect to the other.

One disadvantage of the method employing the variable length delay line in a thyratron pulse generator is the necessity of mechanical rotation of a set of switch contacts to change the length of the delay line and the duration of the pulse. The disadvantage of the method which adds two step functions is the necessity of more circuitry to add the steps or maintain the amplitudes of the two steps equal and to keep the resultant output pulse width of steady duration.

The present invention in one preferred embodiment consists essentially of two thyratrons with their grids connected through isolating resistors and a condenser to a square wave trigger of high frequency such as one kilocycle. One of the tubes is provided with a variable bias resistance for connection of its control grid to the C— supply and the anode is connected directly through a load resistance to the B+ or plate supply. The other tube has its control grid connected to the C— supply through a fixed resistance and is provided with a capacitor shunted to ground from the grid circuit. The anode of the second tube is connected to the common load resistance through a delay line. The shunt capacitance on the second tube increases the rise time of the trigger as it is applied to the grid of this tube and, for the same bias voltage, would cause the second tube to fire later than the first tube. However, by changing the bias voltage through the variable resistor on the first tube, the first tube can be made to fire either earlier or later than the second tube. The current through the first tube will cause a voltage drop across the load resistance and also send a step voltage through the delay line which is effectively terminated and would normally cause a reflected step of opposite polarity to travel back through the delay line and terminate the output pulse across the cathode resistor at a time equal to twice the delay time. With the second tube having its anode connected to the load resistance through the delay line, a second step voltage is sent through the delay line in the opposite direction thus effectively shortening the electrical length of the line, causing the first step voltage to reflect earlier and shortening the duration of the output pulse, thus providing an output pulse which may be made of very short duration and having extremely sharp rise and fall times, or steep leading and trailing edges. Thus the maximum length of the pulse is twice the delay time set by the delay line and the minimum length for a given voltage amplitude is determined by the rise time of the output pulse which is a function of the load resistance and the capacitance across it, as well as the cutoff frequency of the delay line.

One object of the present invention is to provide an improved pulse generator utilizing thyratron tubes wherein the width of the pulse may be accurately but continuously varied.

A further object of the present invention is to provide a variable width pulse generator wherein the pulse shape and its maximum width may be readily determined.

A still further object of the present invention is to provide a variable width pulse generator which is simple in construction and reliable in operation.

Another object of the present invention is to provide a variable width pulse generator wherein the pulse width may be controlled by an electrical voltage rather than by manual operation of a control thus facilitating its use in certain circuits such as those involving feedback control of pulse width and in pulse width modulation work.

Still another object of the present invention is the provision of a variable width pulse generator utilizing a delay line wherein the electrical length of the delay line may be shortened by discharging consecutive portions of it while leaving the other portions charged.

A still further object of the present invention is the provision of a variable width pulse generator utilizing a delay line and wherein the maximum length or duration of the pulse is limited to twice the delay time and the minimum length for a given voltage output is determined by the rise time of the output pulse which in turn is a function of the load resistance, the capacitance across it, and the cut-off frequency of the delay line.

Other objects and many of the attendant advantages of this invention will be readily appreciated as the same becomes better understood by reference to the following detailed description when considered in connection with the accompanying drawings wherein.

Figures 1, 2:
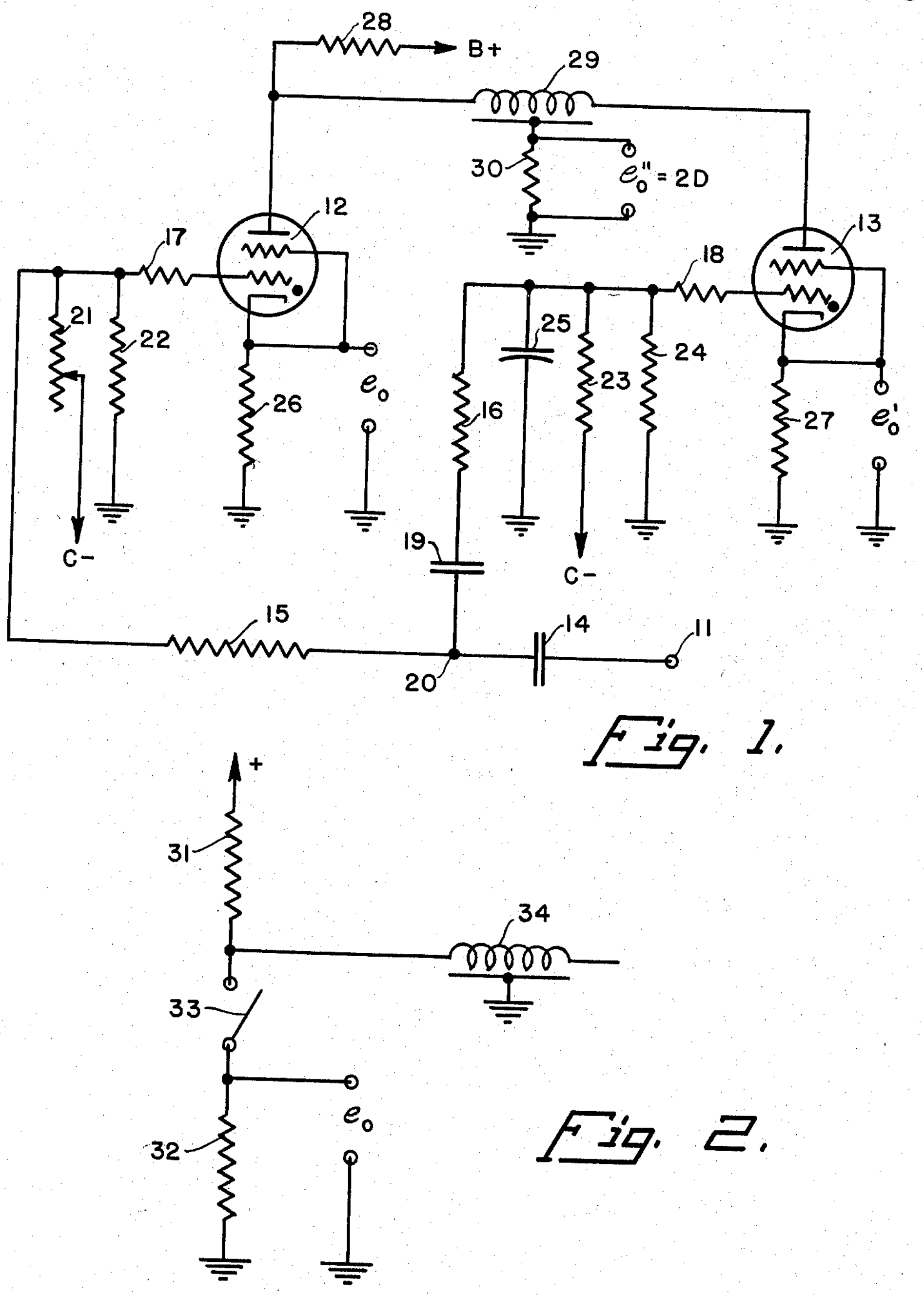
Fig. 1 is a schematic circuit diagram illustrating one preferred form of the present invention.
Fig. 2 is a schematic circuit diagram illustrating the equivalent circuit of a conventional pulse generator utilizing a delay line in its simplest form.
Figure 3:
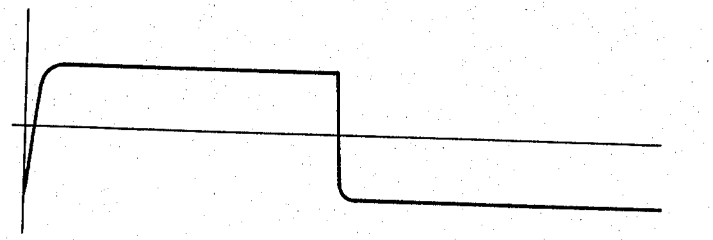
Fig. 3 is a diagram illustrating the envelope of the trigger wave form as applied to the circuit of Fig. 1.
Figure 4:
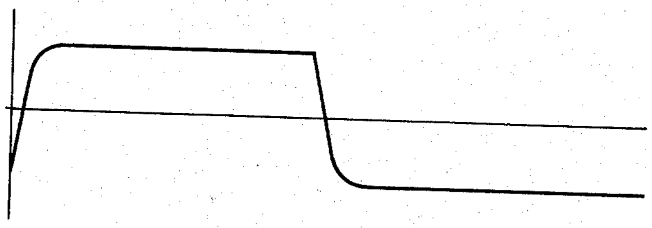
Fig. 4 is a diagram illustrating the envelope of the trigger wave form as applied to the grid of the right hand tube shown in Fig. 1.
Figure 5:
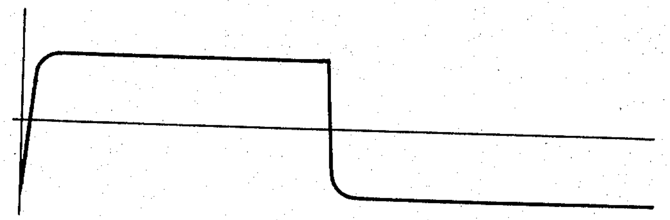
Fig. 5 is a diagram illustrating the envelope of the trigger wave form as applied to the grid of the left hand tube in Fig. 1.

Referring now to the drawings in detail, the schematic circuit diagram of Fig. 1, illustrating one preferred form of the present invention, has an input terminal 11 to which is applied a trigger voltage such as a one kilocycle pulse having a 0.2 microsecond rise time which is applied to the grid circuits of tubes 12 and 13 through a common D. C. blocking capacitor 14 and through isolating resistors 15 and 16 and protective resistors 17 and 18 respectively. Another capacitor 19 may be provided if desired between resistor 16 and junction 20 to prevent interdependence of the bias voltages on both tubes 12 and 13, although this is not necessary to the operativeness of the circuit. Bias resistors 21 and 22 and resistors 23 and 24 set the bias for the thyratron tubes 12 and 13 respectively. Condenser 25 increases the rise time of the trigger at the junction of resistors 23 and 24, so that for equal bias voltages tube 13 fires later than tube 12. The difference in slope is clearly illustrated in Figs. 4 and 5 as compared with the wave form of the trigger in Fig. 3. Thus by changing the value of the variable resistor 21 and hence the bias of tube 12, tube 12 may be made to fire earlier or later than tube 13. This is illustrated clearly by the diagram in Fig. 6 wherein with equal initial bias on both tubes of $E_{c1}$ the critical grid voltage for tube 12 is reached at a time $T_1$ and for tube 13 at the time $T_2$, a short interval later.

Figure 6:
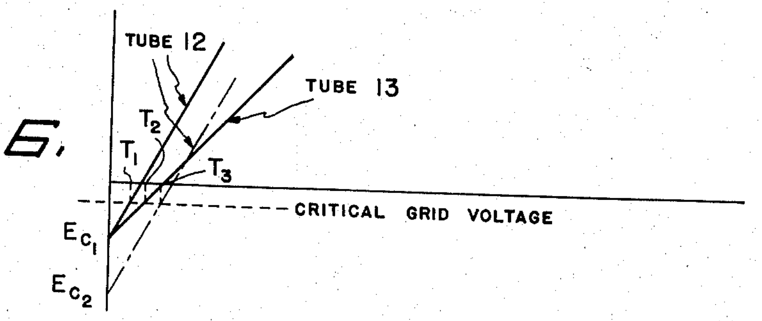
Fig. 6 is a diagram illustrating the initial slope of the wave forms shown in Figs. 4 and 5 to demonstrate the manner in which the firing times may be varied to modify the time duration of the output pulse.

With a more negative bias of $E_{c2}$ on tube 12, as illustrated in Fig. 6 by the dash and dot line, tube 12 will not reach its critical grid voltage until a time $T_3$ subsequent to the firing of tube 13 which has a fixed grid voltage.

The cathode resistor 26 is provided for the tube 12 and another cathode resistor 27 is provided for the tube 13, the output voltage $e_0$ being taken off across the cathode resistor 26 on the tube 12, and the output voltage $e_0'$ across resistor 27.

Figure 7:
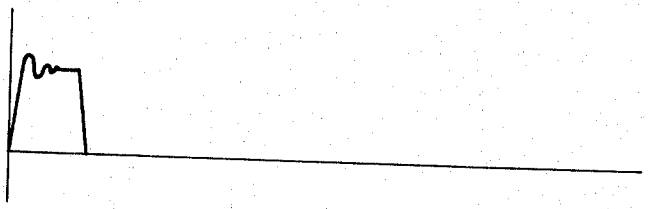
Fig. 7 is a diagram illustrating the wave form of the output pulse from the terminals across which $e_0$ is taken.

A common load resistor 28 is connected to the plates of both tubes 12 and 13 and to the B+ or anode supply voltage. An open ended delay line 29 is connected between the plates of tubes 12 and 13. The circuit functions in a manner to be described subsequently to provide a pulse of variable time duration such as the one illustrated in Fig. 7, as well as the other pulse outputs.

Referring now to the schematic circuit diagram of Fig. 2, the equivalent circuit of a typical conventional pulse generator is illustrated to demonstrate the theory of the present invention, and consists of resisors 31 and 32 in series with a switch 33 and connected to a supply of D. C. voltage as indicated. An open ended delay line 34 is connected to the junction between resistor 31 and switch 33. The output voltage $e_0$ is taken off between ground and the junction of resistor 32 and switch 33. The operation of this equivalent circuit is typical of conventional open ended delay line pulse generators, wherein a fixed delay is provided, and is comparable to the operation of a circuit including thyratron tube 12 with the delay line 29 but without the circuit of thyratron tube 13.

At a time T equal to 0 the switch 33 closes and this is comparable to the firing of the thyratron tube 12. A negative step starts down the delay line causing a discharge current to flow through the load resistor 31, and, when this negative step reaches the end of the line at a time T equal to D, where D is the electrical length of the delay line, it is inverted and reflected as a positive step which reaches the switch end of the delay line at a time T equal to 2D. At this time the line is fully discharged and the discharge current stops flowing. Preferably, the value of resistor 32 equals the internal impedance of the delay line, and thus the output pulse has an amplitude of $1/2E_{bb}$ (where $E_{bb}$ is the anode supply voltage) and a length of 2D, thus the output pulse has an amplitude which is dependent on the supply voltage and the value of resistor 32, and a length of 2D.

It is evident from the foregoing discussion that the length of the pulse is a function of the time when the reflected step voltage arrives at the switch end of the line, and the circuit of Fig. 1 is based on this principle.

*Operation*

In the operation of the circuit illustrated in Fig. 1 a trigger voltage which may be a one kilocycle pulse of 0.2 microsecond rise time is applied to the grid circuits of tubes 12 and 13 through the D. C. blocking capacitors 14 and 19, and at a time $T_1$ or $T_3$, as illustrated in Fig. 6, tube 12 will fire depending on the setting of variable bias resistor 21 thus starting a negative step voltage down the delay line 29. At a time $T_2$, which may be earlier or later, tube 13 fires starting a step voltage down the delay line in the opposite direction and initating the reflected step before the incident step from tube 12 arrives at the end of the delay line 29. The result of the firing of tube 13 is to effectively shorten the electrical length of the line and hence the output pulse has a duration less than 2D.

For the particular plate supply used the value of resistor 28 should be large enough to prevent either tube from remaining ionized after the delay line is discharged to terminate the pulse. During discharge of the delay line a relatively large current is maintained through both tubes, but after discharging the delay line the current through a large resistance in the anode circuit is insufficient to maintain ionization in the thyratron tubes 12 and 13 which will then stop conducting.

Thus the maximum length of the pulse is 2D set by the delay line, and the minimum length for a given output voltage is set by the rise time of the output pulse which is a function of the load resistance 28, the capacitance across it, and the cut-off frequency of the delay line.

Another pulse output $e_0'$ may be obtained from terminals across the cathode resistor 27 which will be complementary to the output $e_0$ across resistor 26, i. e., $e_0 + e_0' = 2D$.

However, these outputs differ in their timing relation to the trigger input. The output $e_0'$ will always have a leading edge at a fixed time and the trailing edge will vary as the pulse duration varies, whereas $e_0$ will have both a varying leading edge and a varying trailing edge with the center of the pulse coincident with the center of the pulse $e_0'$.

Another pulse $e_0''$ of fixed duration equal to 2D may be obtained across resistor 30 between delay line 29 and ground.

Any one or more of the pulse outputs may obviously be utilized in conjunction with testing or operation of many conventional types of electronic apparatus.

It will be apparent that equivalent vacuum tube, transistor, relay or other types of switching circuits may be utilized in place of the thyratron circuits illustrated as the preferred embodiment.

Other means may be used for varying the firing times of the tubes or the timing relation of alternate switching means. For example, in the circuit illustrated in Fig. 1, the resistor 21 could be of fixed value and the condenser 25 could be made variable to alter the slope of the trigger waveform as applied to tube 13. However, this arrangement is not as versatile as the circuit of Fig. 1. Separate timed trigger pulses to each of the tubes or other switching means could also be utilized to provide a pulse output of variable duration.

It will be apparent that the circuit of the present invention has numerous advantages over older methods of obtaining a variable width pulse with a delay line type of pulse generator. One of the most important of these advantages is that the circuit is controllable by electrical voltage to vary the time duration of the pulse thus facilitating its use in a circuit involving feedback control of pulse width and making it useful in pulse width modulation work.

Obviously many modifications and variations of the present invention are possible in the light of the above teachings. It is therefore to be understood that within the scope of the appended claims the invention may be practiced otherwise than as specifically described.

What is claimed is:

1. A variable width pulse generator comprising a concentrated delay line, a switching circuit connected to one end of said delay line, another switching circuit connected to the other end of said delay line, each of said circuits having control means for controlling the operation and conduction of said circuits, and means for selectively actuating each of said control means in timed relation.

2. A variable width pulse generator comprising a concentrated electrical delay line, an electronic switching circuit connected to one end of said delay line, another electronic switching circuit connected to the other end of said delay line, each of said circuits having control means for controlling the operation and conduction of said circuits, and means for selectively actuating each of said control means in timed relation.

3. A variable width pulse generator comprising a concentrated electrical delay line, a switching circuit including a series resistance element connected to one end of said delay line, another switching circuit including a series resistance element connected to the other end of said delay line, each of said circuits having control means for controlling the operation and conduction of said circuits, and means for selectively actuating each of said control means in timed relation to provide an output pulse of variable duration across each of said resistance elements.

4. A variable width pulse generator comprising a concentrated electrical delay line, an electronic switching circuit including a series resistance element connected to one-end of said delay line, another electronic switching circuit including a series resistance element connected to the other end of said delay line, each of said circuits having control means for controlling the operation and conduction of said circuits, and means for selectively actuating each of said control means in timed relation to provide an output pulse of variable duration across each of said resistance elements.

5. A variable width pulse generator comprising a concentrated electrical delay line, a switching circuit connected to one end of said delay line, another switching circuit connected to the other end of said delay line, each of said circuits having control means for controlling the operation and conduction of said circuits, means for applying a trigger voltage having a rapid rise time to the control means of said circuit, means for increasing the rise time of the trigger as applied to one of said circuits, and means for varying the control means on the other of said circuits whereby said other circuit may be made to close earlier or later than said first circuit.

6. A variable width pulse generator comprising a concentrated electrical delay line, an electronic switching circuit including an electron discharge device and a series resistance element connected to one end of said delay line, another electronic switching circuit including an electron discharge device and a series resistance element connected to the other end of said delay line, each of said circuits having grid control means for controlling the operation and conduction of said discharge devices, means for applying a trigger voltage having a rapid rise time to the grid control means of said circuits, means for increasing the rise time of the trigger applied to one of said circuits, and means for varying the bias on the grid control means of the other of said circuits whereby said other circuit may be made to close earlier or later than said first circuit.

7. A variable width pulse generator comprising a concentrated electrical delay line, a pair of grid controlled thyratron gas discharge tubes having their anodes connected to each of the opposite ends of said delay line, each of said tubes having a grid circuit connected thereto, means for applying a trigger voltage having a rapid rise time to the grid circuits of each of said tubes, means for increasing the rise time of the trigger supplied to one of said grids, and means for varying the bias on the grid of the other of said tubes whereby said second tube may be made to fire earlier or later than said first tube.

8. A variable width pulse generator comprising a concentrated electrical delay line, a pair of grid controlled electron discharge tubes, said delay line being connected between the anodes of said tubes, each of said tubes having a grid circuit connected thereto, means for applying a trigger voltage having a short rise time to the grid circuits of both of said tubes, a variable bias resistor connected in the grid circuit of said one tube, said other tube having a fixed bias resistor and a condenser connected in the grid circuit thereof for increasing the rise time of the trigger voltage applied to the grid of said other tube, and a resistance connected in series with said first tube, and means for taking off an output voltage across said resistance consisting of a pulse whose time duration may be varied by varying the bias on said first tube.

9. A variable width pulse generator comprising a concentrated electrical delay line, a pair of grid controlled electron discharge tubes, said delay line being connected between the anodes of said tubes, a load resistor connected to the junction of said delay line and the anode of one of said tubes, each of said tubes having a grid circuit connected thereto, means for applying a trigger voltage having a short rise time to the grid circuits of both of said tubes, a variable bias resistor connected in the grid circuit of said one tube, said other tube having a fixed bias resistor and a condenser connected in the grid circuit thereof for increasing the rise time of the trigger voltage applied to the grid of said other tube, and a cathode resistor connected to said first tube, and means for taking off an output voltage across said cathode resistor consisting of a pulse whose time duration may be varied by varying the bias on said first tube.

10. A variable width pulse generator comprising a concentrated electrical delay line, a pair of grid controlled thyratron gas discharge tubes, said delay line being connected between the anodes of said tubes, a load resistor connected to the junction of said delay line and the anode of one of said tubes, each of said tubes having a grid circuit connected thereto, means for applying a trigger voltage having a short rise time to the grid circuits of both of said tubes, a variable bias resistor connected in the grid circuit of said one tube, said other tube having a fixed bias resistor and a condenser connected in the grid circuit thereof for increasing the rise time of the trigger voltage applied to the grid of said other tube, and a cathode resistor connected to said first tube, and means for taking off an output voltage across said cathode resistor consisting of a pulse whose time duration may be varied by varying the bias on the said first tube.

11. A variable width pulse generator comprising two circuits each including a grid controlled gas discharge tube, a concentrated electrical delay line connected at its opposite ends to the anodes of said tubes, one of said anodes being connected to a load resistance and a source of D. C. voltage, each of the grids of said tubes being provided with a grid circuit having bias means, means for varying the bias on the grid of one of said tubes, the second of said tubes having a condenser in the grid circuit thereof for increasing the rise time of a trigger voltage applied thereto, an isolating resistor connected in the grid circuit of each of said tubes, means for applying a trigger voltage having a short rise time through said isolating resistors to the grids of both of said tubes, and means for deriving a variable pulse output from at least one of said circuits.

12. A variable width pulse generator comprising a pair of grid controlled gas discharge tubes, a concentrated electrical delay line connected at its opposite ends to the anodes of said tubes, one of said anodes being connected to a load resistance and a source of D. C. voltage, each of the grids of said tubes being provided with bias means, means for varying the bias of the grid of one of said tubes, the second of said tubes having a condenser in the grid circuit thereof for increasing the rise time of a trigger voltage applied thereto, an isolating resistor connected in the grid circuit of each of said tubes, and means for applying a trigger voltage having a short rise time through said isolating resistors to the grids of each of said tubes.

13. A variable width pulse generator comprising a pair of grid controlled gas discharge tubes, a concentrated electrical delay line connected at its opposite ends to the anodes of said tubes, one of said anodes being connected to a load resistance and a source of D. C. voltage, each of the grids of said tubes being provided with bias means, the second of said tubes having a condenser in the grid circuit thereof for increasing the rise time of a trigger voltage applied thereto, an isolating resistor connected in the grid circuits of each of said tubes, and means for applying a trigger voltage having a short rise time through said isolating resistors to the grids of each of said tubes.

14. A variable width pulse generator comprising a pair of grid controlled gas discharge tubes, a concentrated electrical delay line connected at its opposite ends to the anodes of said tubes, one of said anodes being connected to a load resistance and a source of D. C. voltage, each of said tubes having a cathode resistor connected thereto, each of the grids of said tubes being provided with bias means, means for varying the bias on the grid of one of said tubes, the second of said tubes having a condenser associated with the grid circuit thereof for increasing the rise time of a trigger voltage applied thereto, an isolating resistor connected in the grid circuit of each of said tubes, a D. C. blocking capacitor in the grid circuit of one of said tubes, and means for applying a trigger voltage having a short rise time through said isolating resistance to the grids of each of said tubes.

15. A variable width pulse generator comprising a pair of grid controlled gas discharge tubes, a concentrated electrical delay line connected at its opposite ends to the anodes of said tubes, one of said anodes being connected to a load resistance and a source of D. C. voltage, each of said tubes having a cathode resistor connected thereto, each of the grids of said tubes being provided with bias means, means for varying the bias on the grid of one of said tubes, the second of said tubes having a condenser in with the grid circuit thereof for increasing the rise time of a trigger voltage applied thereto, an isolating resistor connected in the grid circuit of each of said tubes, a D. C. blocking capacitor in the grid circuit of one of said tubes, and means for deriving a variable pulse output from at least one of said cathode resistors.

16. A precision delay variable width pulse generator comprising a concentrated distributed constant delay network having linear characteristics and terminating in an impedance substantially the same as its characteristic impedance, means for initiating a step voltage connected to one end of said network, means for initiating a step voltage in variable timed relation either before or after said first step voltage connected to the other end of said network, and means for deriving a variable width pulse from said delay network and initiating means.

17. A precision variable width pulse generator comprising a concentrated electrical delay line adapted to reflect a voltage step applied to either end thereof to provide a delayed reproduction of said step, a first means for applying a voltage step to one end of said line, a second means for applying a voltage step to the other end of said line, and means for selectively initiating said first and second means for applying a voltage step in various timed relations whereby said voltage steps are reflected before reaching the end of said line.

18. A precision variable width pulse generator comprising a concentrated electrical delay line adapted to reflect a voltage step applied to either end thereof to provide a delayed reproduction of said step, a first means for applying a voltage step to one end of said line, a second means for applying a voltage step to the other end of said line, means for selectively initiating said first and second means for applying a voltage step in various timed relations whereby said voltage steps are reflected before reaching the end of said line, and means for deriving a variable width pulse output from said delay line and initiating means.

19. A precision variable width pulse generator comprising a concentrated electrical delay line adapted to reflect a voltage step applied to either end thereof to provide a delayed reproduction of said step, a first means for applying a voltage step to one end of said line, means for selectively initiating said first means in timed relation earlier or later than said second means whereby said steps are reflected at different points in said delay line, and means for deriving an output pulse from said delay line and means for applying said voltage steps for deriving an output pulse whose width is dependent on said timed relation.

20. A precision delay variable width pulse generator comprising a concentrated distributed constant delay network having linear characteristics and terminating in an impedance substantially the same as its characteristic impedance, means for applying a negative step voltage to one end of said network, means for applying a negative step voltage to the other end of said network before the incident step at one end arrives at the other end whereby said step voltages meet in said delay line thus effectively shortening the electrical length of the delay line and providing an output pulse having a duration less than twice the delay of said delay line.

References Cited in the file of this patent

UNITED STATES PATENTS

| | | |
|---|---|---|
| 2,201,166 | Germeshausen | May 21, 1940 |
| 2,234,690 | Depp | Mar. 11, 1941 |
| 2,498,257 | Douma | Feb. 21, 1950 |
| 2,508,973 | Smith | May 23, 1950 |